United States Patent
Choi

(10) Patent No.: US 12,072,809 B2
(45) Date of Patent: Aug. 27, 2024

(54) MEMORY SYSTEM, MEMORY CONTROLLER, AND OPERATION METHOD OF MEMORY SYSTEM FOR LOADING AND UPDATING MAPPING INFORMATION TO HOST MEMORY AREA

(71) Applicant: SK hynix Inc., Icheon-si (KR)

(72) Inventor: Kyu Ho Choi, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/035,477

(22) Filed: Sep. 28, 2020

(65) Prior Publication Data
US 2021/0365382 A1 Nov. 25, 2021

(30) Foreign Application Priority Data
May 20, 2020 (KR) .................. 10-2020-0060049

(51) Int. Cl.
*G06F 12/10* (2016.01)
(52) U.S. Cl.
CPC ........ G06F 12/10 (2013.01); *G06F 2212/657* (2013.01)
(58) Field of Classification Search
CPC .. G06F 12/10; G06F 12/0292; G06F 12/1027; G06F 12/1009; G06F 12/1072; G06F 12/109
USPC .......... 711/206, 200, 205, 207, 208, 12.001, 711/12.014, 12.058, 12.061, 12.066
See application file for complete search history.

(56) References Cited

U.S. PATENT DOCUMENTS

| | | | |
|---|---|---|---|
| 8,856,438 B1* | 10/2014 | Warner ................ | G06F 3/0676 711/205 |
| 9,760,503 B2* | 9/2017 | Oh ........................ | G06F 12/145 |
| 11,068,408 B2 | 7/2021 | Kim | |
| 2009/0055573 A1* | 2/2009 | Ito ......................... | G06F 3/0659 711/E12.001 |
| 2011/0296088 A1* | 12/2011 | Duzly ................. | G06F 12/0246 711/E12.001 |
| 2017/0192902 A1* | 7/2017 | Hwang ................ | G06F 3/0661 |

(Continued)

FOREIGN PATENT DOCUMENTS

| | | |
|---|---|---|
| CN | 109992537 A | 7/2019 |
| KR | 10-2014-0065856 A | 5/2014 |

(Continued)

OTHER PUBLICATIONS

Office Action mailed Jul. 28, 2023 for Chinese Patent Application No. 202110024914.1.

*Primary Examiner* — Sanjiv Shah
*Assistant Examiner* — Edward Waddy, Jr.
(74) *Attorney, Agent, or Firm* — Perkins Coie LLP

(57) ABSTRACT

The memory system is provided to include a memory device, and a memory controller configured to control the memory device. The memory controller is configured to transmit, after the host completes a first initial setting operation for the memory system, mapping information between a logical address and a physical address to a host in order to load the mapping information between the logical address and the physical address into a host memory area located in the host, and to transmit, before the host executes a second initial setting operation for the memory system, to the host, updated mapping information between the logical address and the physical address to update, based on a change made to the host memory area.

10 Claims, 11 Drawing Sheets

(56) References Cited

U.S. PATENT DOCUMENTS

| | | | |
|---|---|---|---|
| 2018/0039578 A1* | 2/2018 | Yun | G06F 3/0653 |
| 2019/0164594 A1* | 5/2019 | Eom | G11C 11/4096 |
| 2020/0142630 A1* | 5/2020 | Lee | G06F 9/4401 |
| 2020/0285417 A1* | 9/2020 | Onodera | G06F 3/0659 |
| 2021/0240389 A1* | 8/2021 | Sela | G06F 12/1408 |
| 2021/0263864 A1* | 8/2021 | Hanna | G06F 3/0631 |

FOREIGN PATENT DOCUMENTS

| | | |
|---|---|---|
| KR | 10-2015-0015764 A | 2/2015 |
| KR | 10-2018-0016679 A | 2/2018 |

* cited by examiner

MEMORY SYSTEM, MEMORY CONTROLLER, AND OPERATION METHOD OF MEMORY SYSTEM FOR LOADING AND UPDATING MAPPING INFORMATION TO HOST MEMORY AREA

CROSS REFERENCE TO RELATED APPLICATION

This patent document claims the priority and benefits of Korean patent application number 10-2020-0060049 filed on May 20, 2020, which is incorporated herein by reference in its entirety.

TECHNICAL FIELD

The technology and implementations disclosed in this patent document relate to a memory system, a memory controller, and an operation method thereof.

BACKGROUND

Storage devices refer to electronic components that are used to store data on a permanent or temporary basis. Each storage device may include one or more storage medium to store data and operate based on a request from a host. Examples of the host include a computer, a mobile terminal such as a smartphone or a tablet, or other various other electronic devices. The storage device can be classified based on the type of storage medium. For example, a hard disk drive (HDD) uses a magnetic disk as the storage medium, and a solid state drive (SSD), a universal flash storage device (UFS), or an embedded MMC (eMMC) device use, as the storage medium, semiconductor devices such as a volatile memory device and a nonvolatile memory device.

A memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

When outputting a command to the memory system, the host may output mapping information between a logical address LA and a physical address PA together with the command. This serves to improve the performance of a read operation or a write operation by reducing the time required for the memory system to search for the mapping information between the logical address LA and the physical address PA in a mapping table or a map cache. To this end, when performing an initial setting operation for the memory system, the host may obtain the mapping information between the logical address LA and the physical address PA from the memory system.

SUMMARY

Embodiments of the disclosed technology may provide a memory system, a memory controller, and an operation method thereof that can improve responsiveness to a host.

In addition, embodiments of the disclosed technology may provide a memory system, a memory controller, and an operation method thereof that can allow a host to efficiently manage mapping information between a logical address and a physical address.

In an aspect, embodiments of the disclosed technology may provide a memory system including: a memory device structured to provide memory for storing information; and a memory controller configured to control the memory device. The memory controller may be communicatively coupled to a host that accesses the memory system. The memory controller may transmit, after the host completes a first initial setting operation for the memory system, mapping information between a logical address and a physical address to the host in order to load the mapping information between the logical address and the physical address into a host memory area located in the host. The memory controller may transmit, to the host, the updated mapping information between the logical address and the physical address to update, based on a change made to the host memory area, the mapping information loaded into the host memory area before the host executes a second initial setting operation for the memory system subsequent to the first initial setting operation.

In some implementations, the memory controller may receive information on a start address and a size of the host memory area from the host. At this time, the size of the host memory area may be indicated as a count value of a unit area determined based on the memory device. In some implementations, when receiving a first query command that requests to transmit the mapping information from the host to the host memory area, the memory controller may transmit the mapping information to the host. In some implementations, when receiving a second query command that requests an update of the mapping information loaded into the host memory area after receiving the first query command, the memory controller may transmit the updated mapping information to the host. In some implementations, the memory controller may receive a command which includes the mapping information or the updated mapping information to perform a read operation or write operation.

In another aspect, embodiments of the disclosed technology may provide a memory controller including: a memory interface, configured to communicate with a memory device; and a control circuit in communication with the memory device and a host that accesses the memory controller, wherein the control circuit is configured to control the memory device. The control circuit may transmit, after a first initial setting operation of the host, mapping information between a logical address and a physical address to the host to load the mapping information between the logical address and the physical address into a host memory area located in the host. The control circuit may transmit updated mapping information between the logical address and the physical address to the host before a second initial setting operation of the host. The mapping information is updated based on a change made to the host memory area located in the host.

In some implementations, the control circuit may receive information on a start address and a size of the host memory area from the host. At this time, the size of the host memory area may be indicated as a count value of a unit area determined based on the memory device. In some implementations, when receiving a first query command that requests to transmit of the mapping information from the host to the host memory area, the control circuit may transmit the mapping information to the host. In some implementations, when receiving a second query command that requests update of the mapping information loaded into the host memory area after receiving the first query command, the control circuit may transmit the updated mapping information to the host. In some implementations, the control circuit may receive a command which includes the mapping information or the updated mapping information to perform a read operation or write operation.

In still another aspect, embodiments of the disclosed technology may provide an operation method of a memory system, including: receiving, from a host, a request to transmit mapping information between a logical address and a physical address after the host completes a first initial setting operation for the memory system, the mapping information to be loaded in a host memory area located in the host. The operation method of the memory system may further include: transmitting the mapping information between the logical address and the physical address to the host in response to the request from the host. The operation method of the memory system may include: transmitting updated mapping information to the host in order to update the mapping information before the host executes a second initial setting operation for the memory system.

In some implementations, the operation method of the memory system may further include: receiving information on a start address and a size of the host memory area from the host. At this time, the size of the host memory area may be indicated as a count value of a unit area. In some implementations, the request to transmit the mapping information may include a first query command that requests to transmit the mapping information into the host memory area. In some implementations, the transmitting of the updated mapping information may be performed in response to receiving a second query command that requests to update the mapping information loaded into the host memory area.

The operation method of the memory system may further include receiving, from the host, a command which includes the mapping information or the updated mapping information to perform a read operation or a write operation.

The mapping information may be updated based on a change made to the host memory area located in the host.

According to embodiments of the disclosed technology, it is possible to improve responsiveness to a host.

In addition, according to embodiments of the disclosed technology, it is possible to enable the host to efficiently manage mapping information between the logical address and the physical address.

BRIEF DESCRIPTION OF THE DRAWINGS

The above and other aspects, features and advantages of the disclosed technology will be more apparent from the following detailed description taken in conjunction with the accompanying drawings, in which.

DETAILED DESCRIPTION OF THE EXEMPLARY EMBODIMENTS

Hereinafter, examples of embodiments of the disclosed technology will be described in detail with reference to the accompanying drawings.

Figure 1:
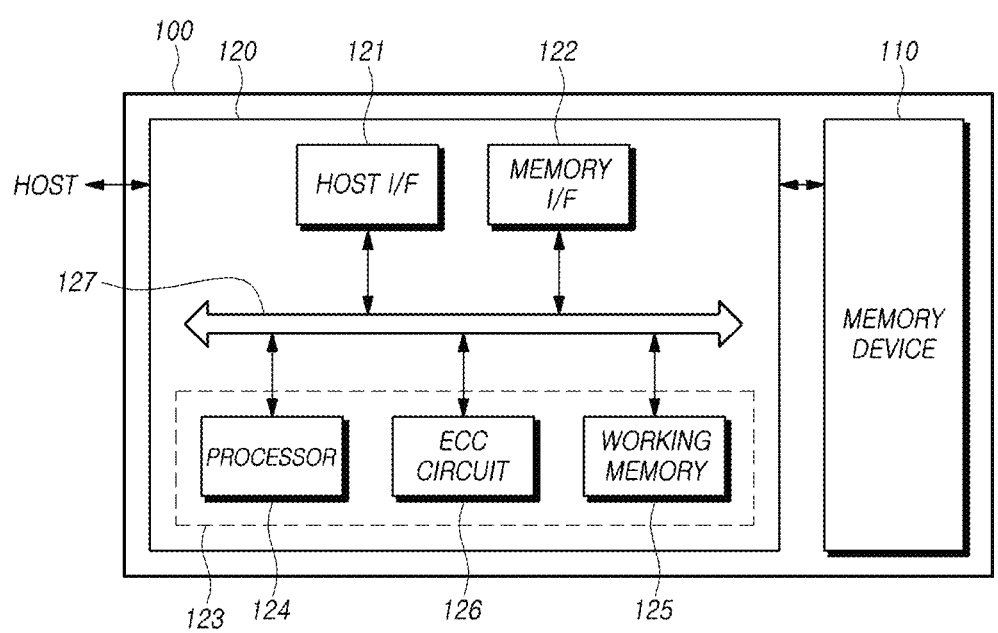
FIG. 1 is a diagram illustrating a schematic configuration of a memory system according to an embodiment of the disclosed technology.

FIG. 1 is a diagram illustrating the schematic configuration of a memory system 100 based on an embodiment of the disclosed technology.

Referring to FIG. 1, the memory system 100 based on an embodiment of the disclosed technology may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells"), each configured to store data. In some implementations, each of the memory cells can be structured or operated to store a single bit or more bits of information. The memory cell array may be organized in different blocks and pages for memory operations. The cells of the memory cell array may be organized to include a plurality of memory blocks. Each memory block may include a plurality of pages, and each page corresponds to a plurality of memory cells.

For example, the memory device 110 may be implemented in various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. In some implementations, embodiments of the disclosed technology are applicable to a flash memory device having an electric charge storage layer configured as a conductive floating gate. In some other implementations, the embodiments of the disclosed technology are applied to a flash memory device having a charge trap flash (CTF) having an electric charge storage layer configured as an insulating film.

The memory controller 120 can access the memory device 110 based on requests from the user/host by providing command/address signals to the memory controller 120. In some implementations, the memory device 110 may be configured to receive, from the memory controller 120, a command and an address in which the command is performed or executed, and access an area of the memory cell array which is selected by the address. For example, the memory device 110 may perform an operation corresponding to the received command in a memory area of the memory device having a physical address corresponding to the received address from the controller.

For example, the memory device 110 may perform a program operation, a read operation, an erasure operation, or others. During the program operation, data is written to the area (e.g., memory cell area) of the memory device 110, which is identified by the address. During the read operation, data is read from the area of the memory device 110, which is identified by the address. During the erasure operation, data is erased from the area of the memory device 110, which is identified by the address.

The memory controller 120 may control write (program), read, erasure, or background operations with regard to the memory device 110. The background operation may include, for example, at least one among a garbage collection (GC) operation, a wear leveling (WL) operation, and a bad block management (BBM) operation. The term "garbage collection" as used herein may refer to a form of memory management, in which a garbage collector attempts to reclaim (garbage) memory that is occupied by objects that are no longer in use. The wear leveling indicates techniques for prolonging lifetime of erasable storage devices.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In some cases, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for an overall control of the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods may include a page mapping method, a block mapping method, and a hybrid mapping method.

The processor 124 may be configured to randomize data received from the host HOST. For example, the processor 124 may randomize data received from the host HOST by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) so as to control the operation of the memory controller 120. In other words, the processor 124 may control the overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include at least one of a flash translation layer (FTL) configured to translate between a logical address that the host HOST requests the memory system 100 to provide and a physical address of the memory device 110, a host interface layer (HIL) configured to interpret a command that the host HOST issues to the memory system 100 (storage device) and to deliver the same to the FTL, and a flash interface layer (FIL) configured to deliver a command issued by the FTL to the memory device 110.

For example, the firmware may be stored in the memory device 110, then be loaded into the working memory 125.

The working memory 125 may store firmware, program codes, commands, or pieces of data necessary to drive the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect an error bit of check target data by using an error correction code, and to correct the detected error bit.

For example, the check target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than or equal to the reference value, the error detection/correction circuit 126 may determine that the corresponding sector is correctable or "a pass".

The error detection/correction circuit 126 may perform error detection and correction operations successively with regard to all pieces of read data. When a sector included in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. Also, in some cases, one or more other constituent elements may be added, in addition to the above-mentioned constituent elements of the memory controller 120.

Hereinafter, the memory device 110 will be described in more detail with reference to FIG. 2.

Figure 2:
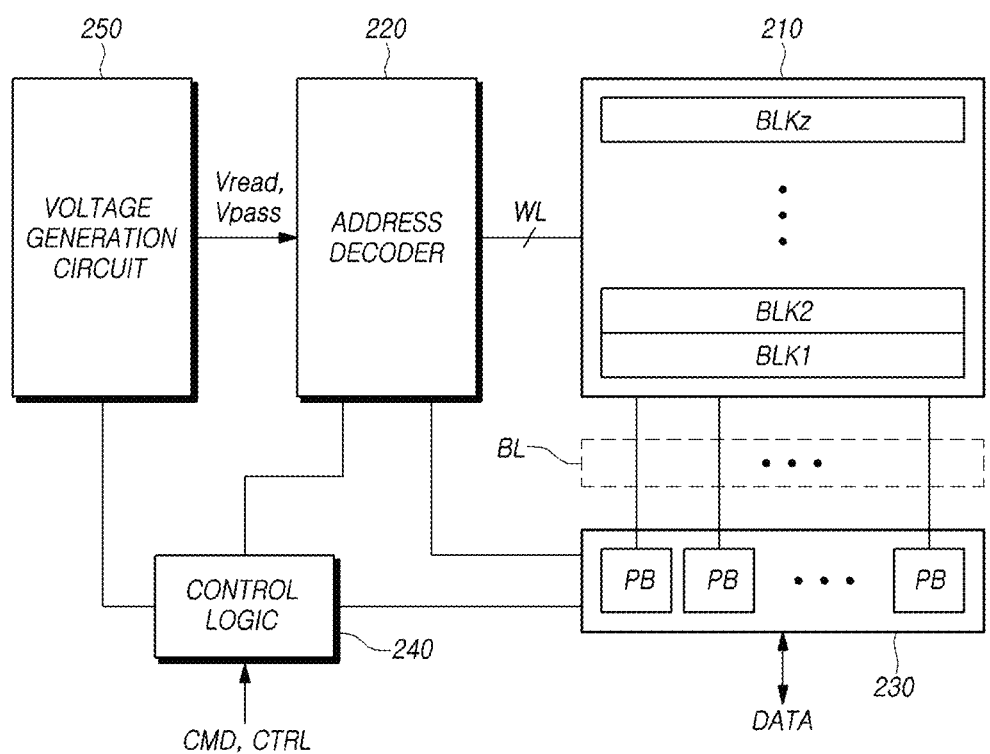
FIG. 2 is a block diagram schematically illustrating a memory device according to an embodiment of the disclosed technology.

FIG. 2 is a block diagram schematically illustrating a memory device 110 based on an embodiment of the disclosed technology.

Referring to FIG. 2, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1 to BLKz (z is a natural number equal to or larger than 2).

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells having a vertical channel structure.

The memory cell array 210 may include a memory cell array having a two-dimensional structure or a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data per memory cell. As another example, each of the multiple memory cells included in the memory cell array 210 may be a multi-level cell (MLC) configured to store two bits of data per memory cell. In another example, each of the multiple memory cells included in the memory cell array 210 may be a triple-level cell (TLC) configured to store three bits of data per memory cell. In another example, each of the multiple memory cells included in the memory cell array 210 may be a quad-level cell (QLC) configured to store four bits of data per memory cell. In another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 250 may apply the read voltage Vread to a selected word line WL inside a selected memory block, during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, an electric change proportional to the current based on the program state of a corresponding memory cell, and may latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
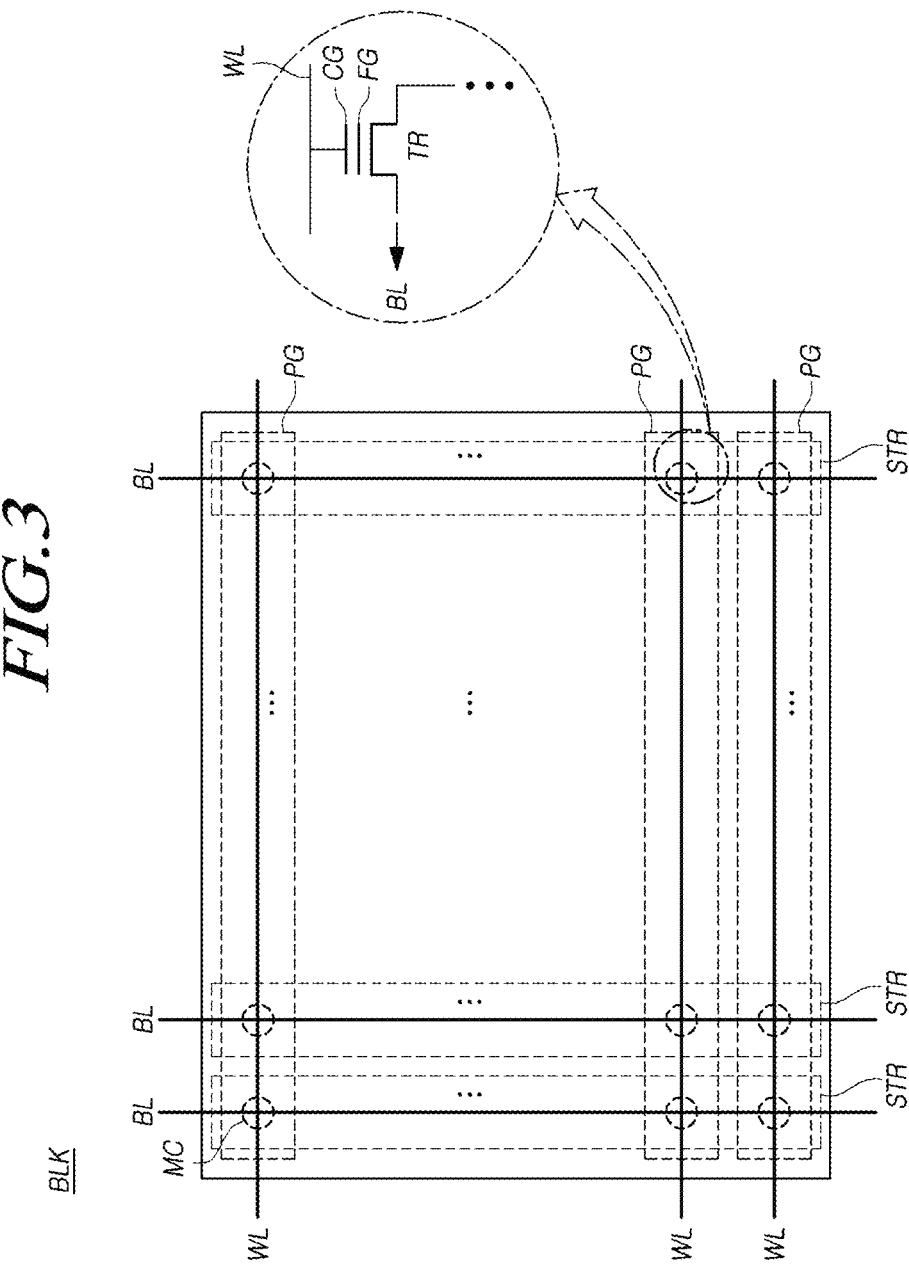
FIG. 3 is a diagram schematically illustrating a memory block of a memory device according to an embodiment of the disclosed technology.

FIG. 3 is a diagram schematically illustrating a memory block BLK of a memory device 110 based on an embodiment of the disclosed technology.

Referring to FIG. 3, a memory block BLK included in the memory device 110 may be arranged and configured in such direction that multiple pages PG and multiple strings TTR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line. The dummy word lines may refer to word lines that are used for purposes other than applying a signal to a corresponding memory cell.

In the case of a memory block structure as illustrated in FIG. 3, a read operation and a program operation (write operation) may be performed on a page basis, and an erasure operation may be performed on a memory block basis.

Figure 4:
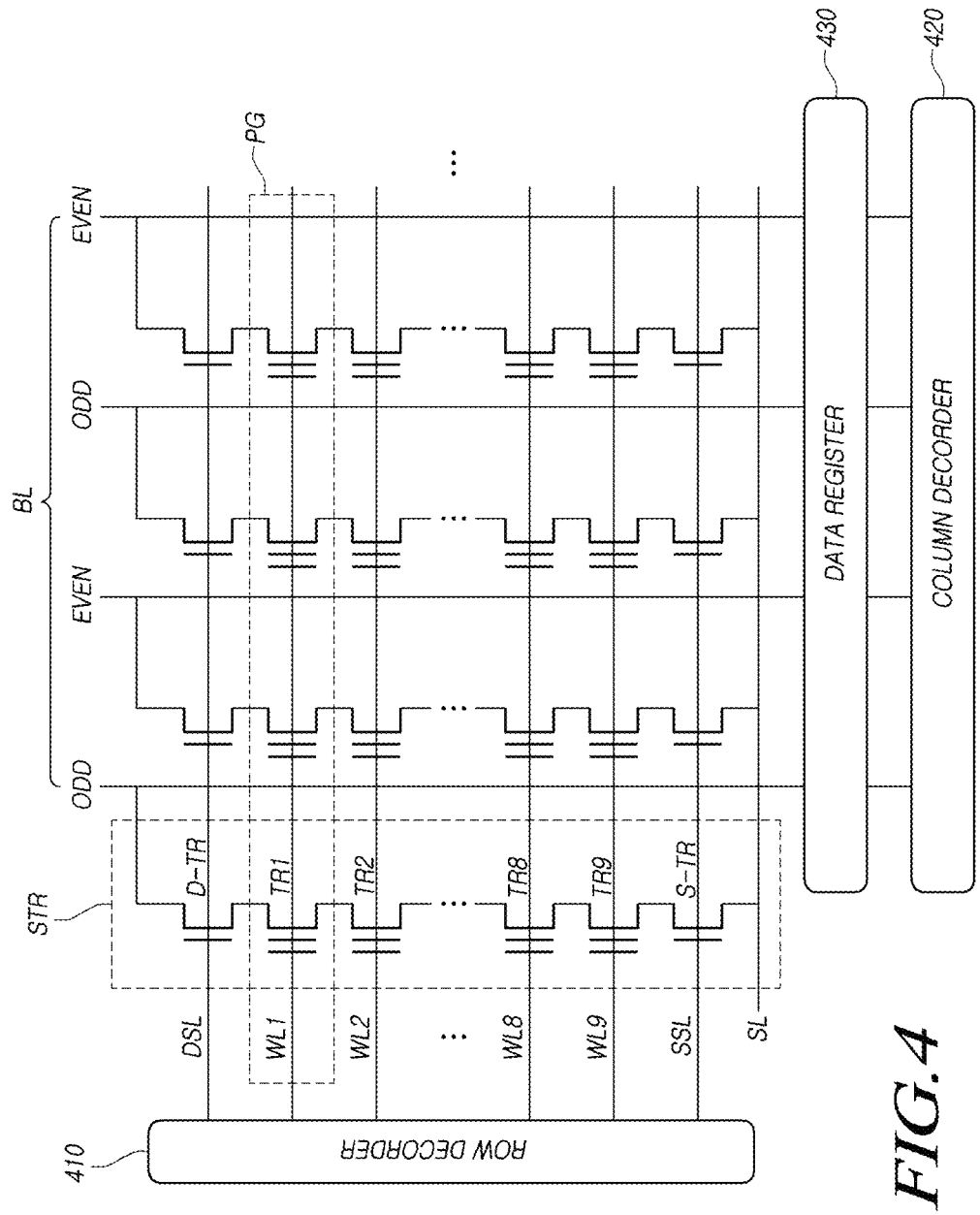
FIG. 4 is a diagram illustrating the structure of word lines and bit lines of a memory device according to an embodiment of the disclosed technology.

FIG. 4 is a diagram illustrating a structure of word lines WL and bit lines BL of a memory device 110 based on an embodiment of the disclosed technology.

Referring to FIG. 4, the memory device 110 has a core area in which memory cells MC are concentrated, and an auxiliary area which corresponds to the remaining area other than the core area. The auxiliary area supports the operations of the memory cell array 210.

The core area may include pages PG and strings STR. In the core area, multiple word lines WL1 to WL9 and multiple bit lines BL are arranged to intersect.

The word lines WL1 to WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1 to WL9 may correspond to multiple pages PG.

For example, each of the multiple word lines WL1 to WL9 may correspond to one page PG as illustrated in FIG. 4. In some implementations, each of the multiple word lines WL1 to WL9 may have a large size and correspond to at least two pages PGs (for example, two or four pages PGs. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 420. In some implementations, the multiple bit lies BL may be divided into odd-numbered bit lines BL and even-numbered bit lines BL such that a pair of odd-numbered bit line BL and even-numbered bit line B are coupled in common to a column decoder 420.

For accessing a memory cell MC, the row decoder 410 and the column decoder 420 may be used to locate a desired memory cell based on the address. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

Data, which are associated with processes by the memory device 110, for example, program and read operations, may be processed via the data register 430. If data processing by the data register 430 is delayed, all the other areas need to wait until the data register 430 finishes the data processing, degrading the overall performance of the memory device 110.

Referring to the example illustrated in FIG. 4, in one string STR, multiple transistors TR1 to TR9 are connected to multiple word lines WL1 to WL9, respectively. In some implementations, the multiple transistors TR1 to TR9 correspond to memory cells MC. In one example, each of the multiple transistors TR1 to TR9 includes a control gate CG and a floating gate FG.

The multiple word lines WL1-WL9 include two outermost word lines WL1 and WL9. A first selection line DSL may be additionally arranged outside the first outermost word line WL1, which is closer to the data register 430 and has a shorter signal path compared to the other outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch that turns on or off the connection between the corresponding string STR and the data register 430. The second selection transistor S-TR is used as a switch that turns on or off the connection between the corresponding string STR and the source line SL. Thus, the first selection transistor D-TR and the second selection transistor S-TR can be used to enable or disable the corresponding string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may apply a predetermined voltage (for example, +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gate FG of the selected memory cells.

Figure 5:
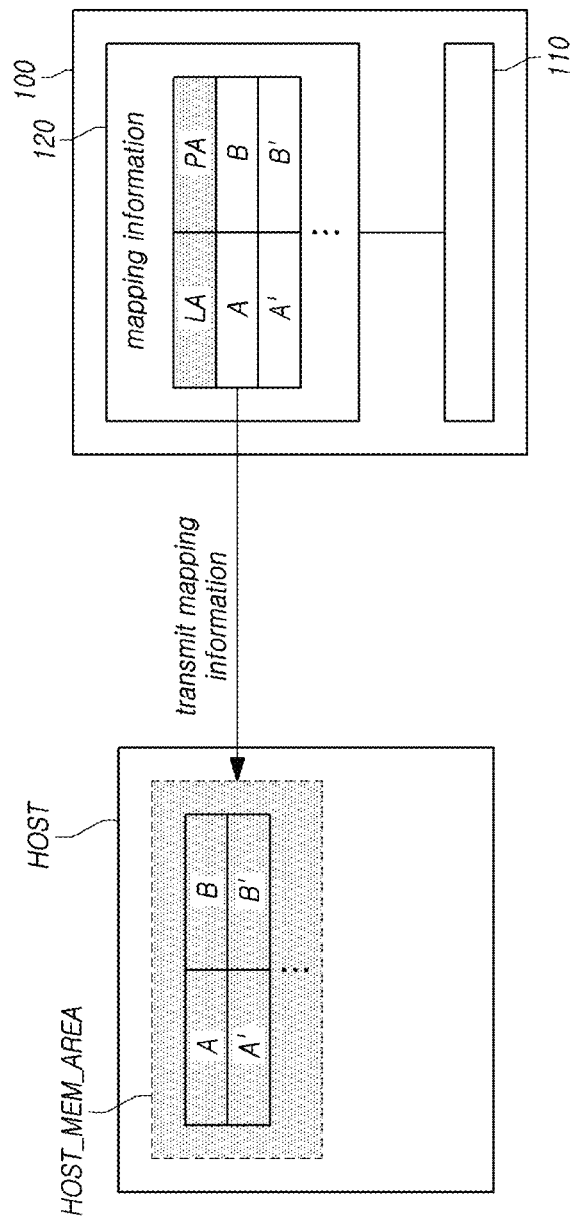
FIG. 5 is a diagram schematically illustrating the operation of a memory system according to embodiments of the disclosed technology.

FIG. 5 is a diagram schematically illustrating the operation of a memory system 100 based on embodiments of the disclosed technology.

The memory system 100 may transmit mapping information between a logical address LA and a physical address PA to a host HOST in response to a request from the host HOST after the host HOST completes an initial setting operation for the memory system 100, thereby allowing the host HOST to load the mapping information into a host memory area HOST_MEM_AREA located in the host HOST.

The host HOST may perform the initial setting operation for the memory system 100 before performing an operation of reading, writing, or erasing data from the memory system 100. The initial setting operation is an operation for setting various setting values required for the host HOST to access the memory system 100. The host HOST may boot the memory system 100 during the initial setting operation.

The host HOST may set a lock after performing the initial setting operation. The host HOST may not perform the initial setting operation for the memory system 100 again until the set lock is released.

The host memory area HOST_MEM_AREA is set while the host HOST performs the initial setting on the memory system 100.

The host memory area HOST_MEM_AREA may be located in a memory (e.g. SRAM, SDRAM, or DRAM) on the host HOST. The host HOST allocates the host memory area HOST_MEM_AREA to store the mapping information.

For example, the memory controller 120 of the memory system 100 may transmit, to the host HOST, mapping information indicating a logical address A and a physical address B mapped to the logical address A, and a logical address A' and a physical address B' mapped to the logical address A' in response to a request from the host HOST.

Upon receiving the mapping information from the memory controller 120 of the memory system 100, the host HOST may load the received mapping information into the host memory area HOST_MEM_AREA. At this time, the number of pieces of mapping information loaded into the host memory area HOST_MEM_AREA may vary based on the request from the host HOST.

When transmitting a command for performing a read operation or a write operation to the memory system 100, the host HOST may allow the mapping information loaded into the host memory area HOST_MEM_AREA to be included in the command, and may transmit the command. In this case, the memory system 100 can respond to the command using the mapping information included in the command without having to access a map cache or a mapping table to search for the physical address corresponding to the logical address. Accordingly, the memory system 100 can improve the speed of a performance requested by the host HOST.

In some implementations, the memory system 100 transmits, to the host HOST, the mapping information between the logical address LA and the physical address PA after the host HOST completes the initial setting operation for the memory system 100. After receiving the mapping information, the host HOST loads the received mapping information in the host memory area HOST_MEM_AREA and sends the command to the memory system 100 by including the loaded mapping information. By doing so, the memory system 100 can perform the read operation or the write operation more quickly.

This is because, when the host HOST performs the initial setting operation for the memory system 100, it is not possible to know which region of the memory system 100 contains data frequently referenced by the host HOST.

At this time, the start address and size of the aforementioned host memory area HOST_MEM_AREA and the mapping information loaded into the host memory area HOST_MEM_AREA may be dynamically changed by the host HOST. This means that the host HOST becomes the entity that controls the host memory area HOST_MEM_AREA.

In some implementations, the host HOST may dynamically change the start address and size of the host memory area HOST_MEM_AREA when it is necessary to modify, delete, or add mapping information loaded into the host memory area HOST_MEM_AREA. The host HOST may request the memory system 100 to transmit the updated mapping information such that the host HOST can load the updated mapping information into the host memory area HOST_MEM_AREA. In addition, the memory controller 120 of the memory system 100 may transmit the updated mapping information to the host HOST in order to update the mapping information into the host memory area HOST_MEM_AREA dynamically changed by the host HOST.

The mapping information frequently referenced by the host HOST may be changed over time. In addition, the size of the memory that the host HOST can allocate to the host memory area HOST_MEM_AREA may be also changed based on the state of the host HOST. For example, the host HOST may increase the size of the host memory area HOST_MEM_AREA to read or write data from the memory system 100 more quickly, or may reduce the size of the host memory area HOST_MEM_AREA to secure memory for other operations.

If it is not allowed for the host HOST to dynamically change the start address and size of the host memory area HOST_MEM_AREA or the mapping information loaded into the host memory area HOST_MEM_AREA, the performance improvement obtained by referring to the mapping information loaded into the host memory area HOST_MEM_AREA may be reduced. This is because the host HOST needs to perform the initial setting operation for the memory system 100 again in order to change the start address and size of the host memory area HOST_MEM_AREA and the mapping information loaded into the host memory area HOST_MEM_AREA.

Accordingly, implementations of the disclosed technology allow the host HOST to dynamically change the start address and size of the host memory area HOST_MEM_AREA and the mapping information loaded into the host memory area HOST_MEM_AREA. Therefore, frequently referenced mapping information can be always loaded into the host memory area HOST_MEM_AREA, and the host HOST can efficiently manage mapping between the logical address and the physical address.

Thus, the host HOST can skip repeating the initial setting operation for the memory system 100 to change the host memory area HOST_MEM_AREA.

Hereinafter, an example of the operation of each of the host HOST and the memory system 100 based on the contents described with reference to FIG. 5 will be described.

Figure 6:
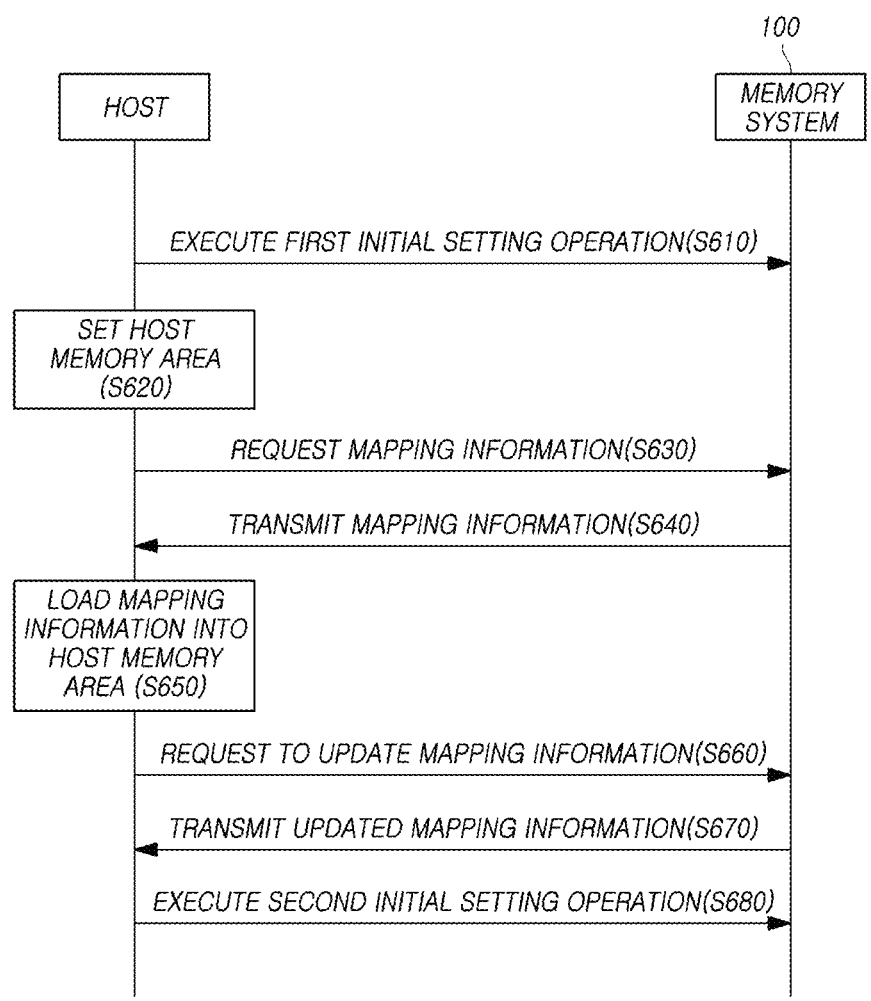
FIG. 6 is a diagram illustrating an example of the operation of each of a host and a memory system according to embodiments of the disclosed technology.

FIG. 6 is a diagram illustrating an example of the operation of each of the host HOST and the memory system 100 based on embodiments of the disclosed technology.

First, in operation S610, the host HOST may perform a first initial setting operation for the memory system 100.

Next, in operation S620, the host HOST may set a host memory area HOST_MEM_AREA in the host HOST. Although FIG. 6 shows that the operation S620 is performed after the first initial setting operation for the memory system 100, the operation S620 can be performed during the first initial setting operation for the memory system 100.

After operation S620, in operation S630, the host HOST may request mapping information to be loaded into the host memory area HOST_MEM_AREA from the memory system 100.

In operation S640, the memory system 100 may transmit mapping information between a logical address and a physical address to the host HOST in response to the request from the host HOST generated in operation S630.

In operation S650, the host HOST may load the mapping information transmitted in the operation S640 by the memory system 100 in operation into the host memory area HOST_MEM_AREA.

After operation S650, in operation S660, the host HOST may request the memory system 100 to update the mapping information in the host memory area HOST_MEM_AREA. The update of the mapping information may be necessary in the case of the change of the host memory area HOST_MEM_AREA and the host HOST requests the memory system 100 to update the mapping information corresponding to the changed host memory area HOST_MEM_AREA. In operation S670, the memory controller 120 of the memory system 100 may transmit the updated mapping information to the host HOST in response to the request from the host HOST.

After operation S670, in operation S680, the host HOST may perform a second initial setting operation for the memory system 100. The second initial setting operation may be performed after the lock set in the first initial setting operation is released.

The memory system 100 may transmit, to the host HOST, the mapping information between the logical address and the physical address in response to the request from the host HOST after the first initial setting operation and before the second initial setting operation, and may transmit, to the host HOST, the mapping information between the logical address and the physical address, which is updated when the host memory area HOST_MEM_AREA is dynamically changed by the host HOST.

Figure 7:
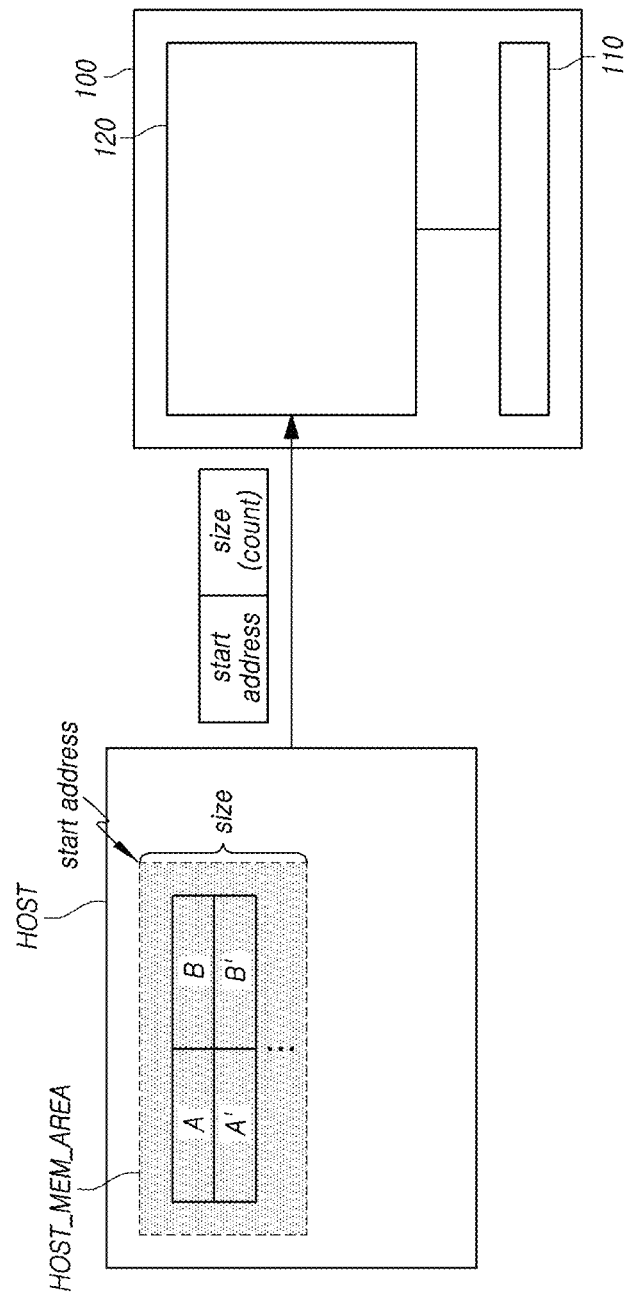
FIG. 7 is a diagram illustrating an example in which a memory system receives information of a host memory area from a host according to embodiments of the disclosed technology.

FIG. 7 is a diagram illustrating an example in which the memory system 100 receives information of the host memory area HOST_MEM_AREA from the host HOST based on embodiments of the disclosed technology.

Referring to FIG. 7, the memory system 100 may receive information on the start address and size of the host memory area HOST_MEM_AREA from the host HOST.

At this time, the size of the host memory area HOST_MEM_AREA may be indicated as a count value of a unit area, determined based on the memory device 110 of the memory system 100.

In this case, the unit area may be determined, for example, as a multiple of a size of a memory block BLK of the memory device 110. For example, if the size of the memory block is 4 MB, the size of the unit area is 4 MB, 8 MB, 12 MB, 16 MB, and so on.

In another example, the unit area may be determined as a multiple of a size of a page included in the memory block BLK of the memory device 100. For example, if the size of the page is 8 kB, the size of the unit area is 8 kB, 16 kB, 24 kB, 32 kB, and so on.

In another example, the unit area may be determined as the size of a super memory block, which is a logical set of the memory blocks BLK of the memory device 100. For example, if four memory blocks having a size of 4 MB constitute one super memory block, the size of the unit area may be 4*4 MB=16 MB.

Below, it is assumed that the size of the unit area is 16 MB. At this time, if the count value of the unit area received from the host HOST is 3, the size of the host memory area HOST_MEM_AREA is 16 MB*3=48 MB. The memory system 100 is aware that the size of the host memory area HOST_MEM_AREA is 48 MB based on the count value 3 of the unit area transmitted by the host HOST.

Hereinafter, in FIGS. 8 to 9, an operation in which the memory system 100 processes mapping information to be loaded into the host memory area HOST_MEM_AREA by processing a query command transmitted by the host HOST will be described.

Figure 8:
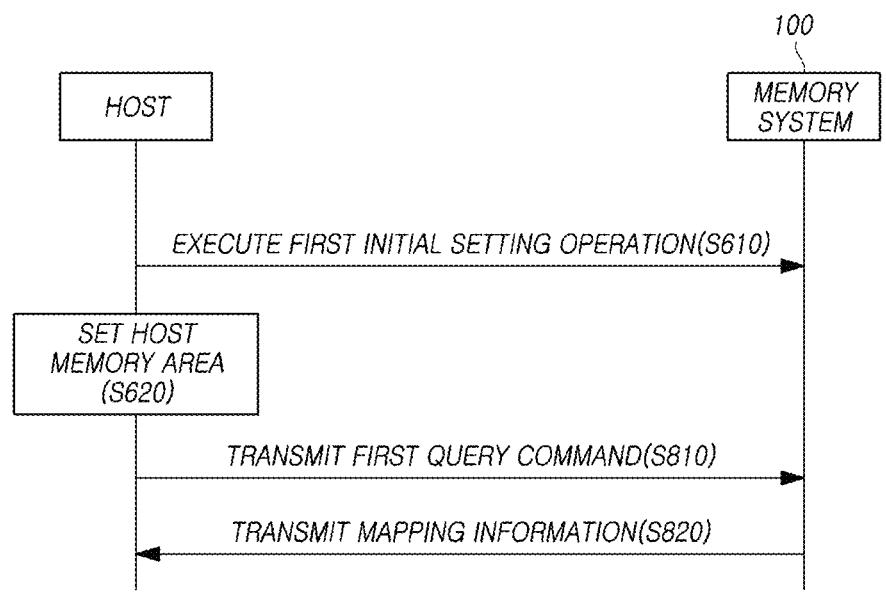
FIG. 8 is a diagram illustrating an example of an operation in which a memory system according to embodiments of the disclosed technology processes a first query command transmitted by a host.

FIG. 8 is a diagram illustrating an example of an operation in which the memory system 100 based on embodiments of the disclosed technology processes a first query command transmitted by the host HOST.

Referring to FIG. 8, in operation S810, the host HOST may transmit a first query command requesting transmission of mapping information between a logical address and a physical address to the memory system 100.

At this time, the time when the host HOST transmits the first query command to the memory system 100 is after operations S610 and S620 described in FIG. 6 are executed.

In operation S820, when receiving the first query command from the host HOST, the memory system 100 may transmit the mapping information requested by the first query command to the host HOST.

Figure 9:
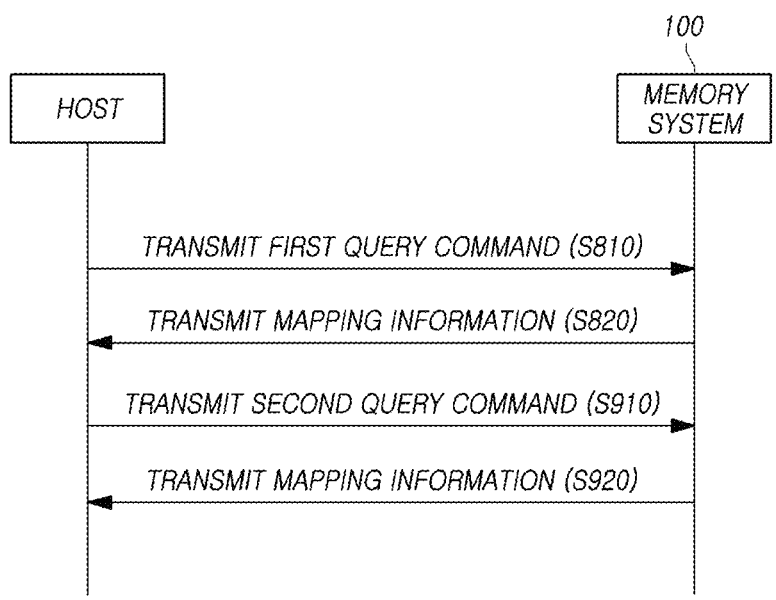
FIG. 9 is a diagram illustrating an example of an operation in which a memory system according to embodiments of the disclosed technology processes a second query command transmitted by a host.

FIG. 9 is a diagram illustrating an example of an operation in which the memory system 100 based on embodiments of the disclosed technology processes a second query command transmitted by the host HOST.

Referring to FIG. 9, in operation S910, the host HOST may transmit a second query command, requesting update of mapping information between a logical address and a physical address, to the memory system 100.

At this time, the time when the host HOST transmits the second query command to the memory system 100 is after operations S810 and S820 described in FIG. 8 are executed.

In operation S920, when receiving the second query command from the host HOST, the memory system 100 may transmit the updated mapping information. The host HOST may update the mapping information loaded into the host memory area HOST_MEM_AREA after receiving the mapping information requested by the second query command from the memory system 100.

Figure 10:
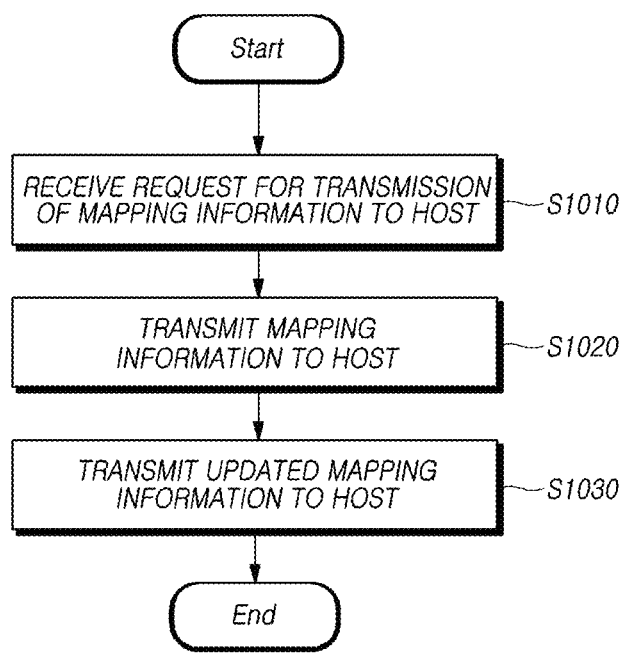
FIG. 10 is a flowchart illustrating an operation method of a memory system according to embodiments of the disclosed technology.

FIG. 10 is a flowchart illustrating an operation method of the memory system 100 based on embodiments of the disclosed technology.

The operation method of the memory system 100 may include receiving, in operation S1010, a request for transmission of mapping information between a logical address and a physical address from the host HOST in order to load the mapping information between the logical address and the physical address into a host memory area HOST_MEM_AREA located in the HOST after the host HOST completes a first initial setting operation for the memory system 100.

Next, the operation method of the memory system 100 may include loading, in operation S1020, the mapping information between the logical address and the physical address into the host memory area HOST_MEM_AREA in response to a request from the host HOST.

Next, the operation method of the memory system 100 may include transmitting, in operation S1030, the updated mapping information between the logical address and the physical address to the host HOST to update the mapping information between the logical address and the physical address in the host memory area, dynamically changed by the host HOST, before the host HOST executes a second initial setting operation for the memory system 100.

At this time, the start address and size of the host memory area HOST_MEM_AREA and the mapping information between the logical address and the physical address loaded into the host memory area HOST_MEM_AREA may be dynamically changed by the host before the host HOST executes the second initial setting operation for the memory system 100.

The operation method of the memory system 100 may further include receiving the start address and size of the host memory area HOST_MEM_AREA from the host HOST, in addition to the above-described operations. In this case, the size of the host memory area HOST_MEM_AREA may be indicated as a count value of the unit area.

In operation S1020 described above, when a first query command requesting loading of the mapping information into the host memory area HOST_MEM_AREA is received from the host HOST, the mapping information may be transmitted to the host HOST.

In operation S1020 described above, when a second query command requesting update of the mapping information loaded into the host memory area HOST_MEM_AREA is received after the first query command is received, the updated mapping information may be transmitted to the host HOST.

The above-described operation of the memory controller 120 may be controlled by the control circuit 123, and the processor 124 may be performed in a manner in which various operations of the memory controller 120 execute (drive) programmed firmware.

Figure 11:
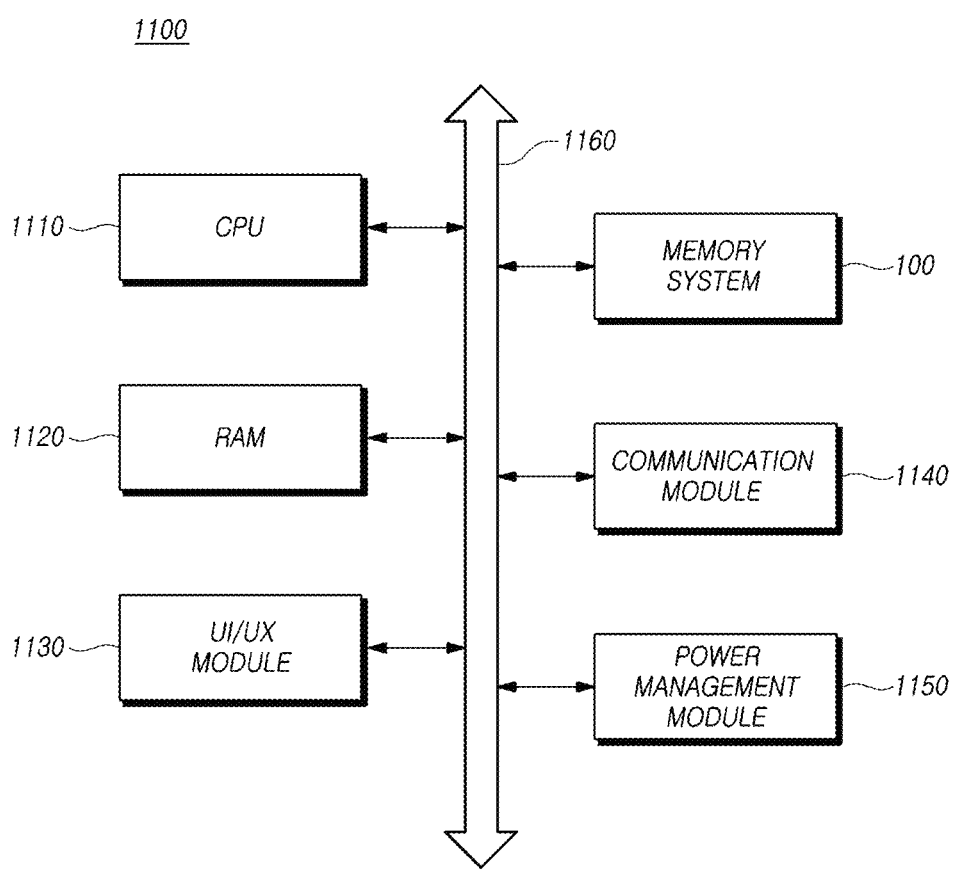
FIG. 11 is a diagram illustrating the configuration of a computing system according to an embodiment of the disclosed technology.

FIG. 11 is a diagram illustrating the configuration of a computing system 1100 based on an embodiment of the disclosed technology.

Referring to FIG. 11, the computing system 1100 based on an embodiment of the disclosed technology may include: a memory system 100 electrically connected to a system bus 1160; a CPU 1110 configured to control the overall operation of the computing system 1100; a RAM 1120 configured to store data and information related to operations of the computing system 1100; a user interface/user experience (UI/UX) module 1130 configured to provide the user with a user environment; a communication module 1140 configured to communicate with an external device in a wired and/or wireless type; and a power management module 1150 configured to manage power used by the computing system 1100.

The computing system 1100 may be a personal computer (PC) or may include a mobile terminal such as a smartphone, a tablet or various electronic devices.

The computing system 1100 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, operation delay time of the memory system may be minimized. In addition, Based on an embodiment of the disclosed technology, overhead occurring in the process of calling a specific function may be minimized. Although various embodiments of the disclosed technology have been illustrated and described, those skilled in the art will appreciate that various modifications, additions and substitutions can be further made.

What is claimed is:

1. A memory system comprising:
a memory device structured to provide memory for storing information; and
a memory controller configured to control the memory device,
wherein the memory controller is communicatively coupled to a host that accesses the memory system and configured to:
transmit, after the host completes a first initial setting operation for setting values to allow the host to access the memory system, mapping information between a logical address and a physical address to the host in order to load the mapping information between the logical address and the physical address into a host memory area located in the host, wherein the host memory area is set while the host performs the first initial setting operation and before the host performs a second initial setting operation, and wherein the host memory area is identified with a start address and a size, and
transmit, before the host executes the second initial setting operation for setting values to allow the host to access the memory system subsequent to the first initial setting operation, to the host, updated mapping information between the logical address and the physical address to update, based on a change made to at least one of the start address or the size of the host memory area, the mapping information between the logical address and the physical address loaded into the host memory area,
wherein the second initial setting operation is not executed until a lock set by the host in the first initial setting operation is released and the second initial setting operation is executed after the lock set in the first initial setting operation is released,
wherein the memory controller is configured to receive information on the start address of the host memory area and the size of the host memory area from the host, the start address and the size of the host memory area being dynamically changed by the host,
wherein the memory controller is configured to transmit the mapping information to the host when receiving, from the host, a first query command that requests to transmit the mapping information to the host memory area, and
wherein the memory controller is configured to transmit the updated mapping information to the host when receiving a second query command indicating a change in at least one of the start address or the size of the host memory area after receiving the first query command.

2. The memory system of claim 1, wherein the size of the host memory area is indicated as a count value of a unit area determined based on the memory device.

3. The memory system of claim 1, wherein the memory controller is configured to receive a command which includes the mapping information or the updated mapping information to perform a read operation or write operation.

4. A memory controller comprising:
a memory interface configured to communicate with a memory device; and
a control circuit in communication with the memory device and a host that accesses the memory controller,
wherein the control circuit is configured to control the memory device by performing operations that include:
transmit mapping information between a logical address and a physical address to the host after a first initial setting operation of the host for setting values to allow the host to access the memory controller, the mapping information to be loaded into a host memory area located in the host, wherein the host memory area is set while the host performs the first initial setting operation and before the host performs a second initial setting operation and the host memory area is identified with a start address and a size, and
transmit updated mapping information between the logical address and the physical address to the host before the second initial setting operation of the host for setting values to allow the host to access the memory controller, wherein the mapping information is updated based on a change made to at least one of the start address or the size of the host memory area located in the host, wherein the second initial setting operation is not executed until a lock set by the host in the first initial setting operation is released and the second initial setting operation is executed after the lock set in the first initial setting operation is released, wherein the control circuit is configured to receive information on the start address of the host memory area and the size of the host memory area from the host, the start address and the size of the host memory area being dynamically changed by the host, wherein the control circuit is configured to transmit the mapping information to the host when receiving, from the host, a first query command that requests to transmit the mapping information to the host memory area, and wherein the control circuit is configured to transmit the updated mapping information to the host when receiving a second query command indicating a change in at least one of the start address or the size of the host memory area after receiving the first query command.

5. The memory controller of claim 4, wherein the size of the host memory area is indicated as a count value of a unit area determined based on the memory device.

6. The memory controller of claim 4, wherein the control circuit is configured to receive a command which includes the mapping information or the updated mapping information to perform a read operation or write operation.

7. An operation method of a memory system, comprising:

receiving, from a host, a request to transmit mapping information between a logical address and a physical address after the host completes a first initial setting operation for setting values to allow the host to access the memory system, the mapping information to be loaded in a host memory area located in the host, wherein the host memory area is set while the host performs the first initial setting operation and before the host performs a second initial setting operation and the host memory area is identified with a start address and a size;

transmitting the mapping information between the logical address and the physical address to the host in response to the request from the host;

transmitting updated mapping information to the host to update the mapping information before the host executes the second initial setting operation for setting values to allow the host to access the memory system; and receiving information on the start address of the host memory area and the size of the host memory area from the host, the start address and the size of the host memory area being dynamically changed by the host, wherein the second initial setting operation is not executed until a lock set by the host in the first initial setting operation is released and the second initial setting operation is executed after the lock set in the first initial setting operation is released, wherein the request to transmit the mapping information includes a first query command that requests to transmit the mapping information into the host memory area, and wherein the transmitting of the updated mapping information is performed in response to receiving a second query command indicating a change in at least one of the start address or the size of the host memory area after receiving the first query command.

8. The operation method of claim 7, wherein the size of the host memory area is indicated as a count value of a unit area.

9. The operation method of claim 7, further comprising receiving, from the host, a command which includes the mapping information or the updated mapping information to perform a read operation or a write operation.

10. The operation method of claim 7, further comprising updating the mapping information based on a change made to at least one of the start address or the size of the host memory area located in the host.

* * * * *